United States Patent
Iyengar

(10) Patent No.: US 9,292,407 B2
(45) Date of Patent: Mar. 22, 2016

(54) SYSTEM AND METHOD FOR ADAPTIVELY COLLECTING PERFORMANCE AND EVENT INFORMATION

(75) Inventor: Arun Kwangil Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 13/433,480

(22) Filed: Mar. 29, 2012

(65) Prior Publication Data

US 2012/0209994 A1 Aug. 16, 2012

Related U.S. Application Data

(60) Division of application No. 12/173,502, filed on Jul. 15, 2008, now Pat. No. 8,402,130, which is a continuation of application No. 11/189,391, filed on Jul. 26, 2005, now Pat. No. 7,734,768.

(51) Int. Cl.
*G06F 15/16* (2006.01)
*G06F 11/34* (2006.01)

(52) U.S. Cl.
CPC ........ *G06F 11/3466* (2013.01); *G06F 11/3409* (2013.01)

(58) Field of Classification Search
CPC . H04L 41/06; H04L 41/0604; G06F 11/3409; G06F 11/3466
USPC ......................................... 709/224, 223, 220
See application file for complete search history.

(56) References Cited

U.S. PATENT DOCUMENTS

| | | | |
|---|---|---|---|
| 6,374,234 B1* | 4/2002 | Netz | |
| 6,456,999 B1* | 9/2002 | Netz | |
| 6,724,940 B1 | 4/2004 | Qian et al. | |
| 6,731,723 B1 | 5/2004 | Garey | |
| 6,731,998 B2 | 5/2004 | Walser et al. | |
| 7,392,515 B2* | 6/2008 | Kimelman et al. | 717/158 |
| 7,472,182 B1 | 12/2008 | Young et al. | |
| 7,644,046 B1* | 1/2010 | Keeton et al. | 705/400 |
| 7,734,768 B2* | 6/2010 | Iyengar | 709/224 |
| 2002/0183972 A1 | 12/2002 | Enck et al. | |
| 2004/0073710 A1 | 4/2004 | Fallon | |
| 2005/0021748 A1 | 1/2005 | Garcea et al. | |
| 2011/0126060 A1* | 5/2011 | Grube et al. | 714/48 |

FOREIGN PATENT DOCUMENTS

| JP | 7084839 A | 3/1995 |
|---|---|---|
| JP | 2004272810 A | 9/2004 |

(Continued)

OTHER PUBLICATIONS

U.S. Official Action mailed Jul. 23, 2012 in related U.S. Appl. No. 12/173,502.

(Continued)

*Primary Examiner* — David Lazaro
(74) *Attorney, Agent, or Firm* — Scully, Scott, Murphy & Presser, P.C.

(57) ABSTRACT

Determination of an optimum batch size for aggregating data wherein, for a number of batch sizes, costs are estimated for sending batched information to persistent storage and for losing batched data. Then, the optimum batch size is selected from the number of different batch sizes based on sums of these costs.

7 Claims, 7 Drawing Sheets

(56) References Cited

FOREIGN PATENT DOCUMENTS

| | | |
|---|---|---|
| JP | 2006133975 A | 5/2006 |
| JP | 2007011568 A | 1/2007 |

OTHER PUBLICATIONS

U.S. Office Action mailed Jul. 9, 2013 in related U.S. Appl. No. 13/433,529.

* cited by examiner

SYSTEM AND METHOD FOR ADAPTIVELY COLLECTING PERFORMANCE AND EVENT INFORMATION

RELATED APPLICATIONS

This application is a divisional of U.S. Ser. No. 12/173,502, filed Jul. 15, 2008, which is a continuation of U.S. Ser. No. 11/189,391, filed Jul. 26, 2005, now U.S. Pat. No. 7,734,768, issued on Jun. 8, 2010, the entire contents of which are incorporated herein by reference.

TECHNICAL FIELD

This invention relates to a method and apparatus for adaptively collect information in a computer system. More specifically, in one aspect of this invention, data can be efficiently aggregated or compressed before storage in persistent memory

BACKGROUND OF THE INVENTION

Computer systems often need to collect performance and/or event information. Performance information may include but is not limited to measurements of CPU utilization, response time, memory utilization, I/O bandwidth, etc. A system may monitor a broad variety of events. For example, Web servers will often record http requests received. Database transactions can also be logged. A system may record information for debugging purposes or for profiling the execution of a program.

Information logging incurs overhead. Storing information on disk consumes I/O bandwidth and may require a context switch. Performance may be adversely affected. In addition, significant amounts of disk space may be consumed. Because of the importance of logging information and the high overhead that can result from logging too much information, more efficient methods are needed for collecting performance and event information.

For example, several tools are available for obtaining performance information about computer systems. The Unix operating system (www dot unix dot org) has features such as /proc for obtaining performance information. The Windows operating system from Microsoft (www dot Microsoft dot com) also has a number of features for providing performance information. IBM provides a number of tools for collecting performance information about computer systems through its Tivoli family of software products (www dot Tivoli dot com).

A key problem with these existing solutions is that they can result in too much information being collected. This can result in too much overhead (for both CPU and storage) for collecting performance information.

SUMMARY OF THE INVENTION

It is an object of this invention to adaptively collecting event information to reduce overhead. More specifically, in one aspect of this invention, methods are provided to balance both CPU and space overhead.

Other specific aspects of this invention include techniques such as aggregating multiple entities into a smaller number of entities and compressing data to reduce the amount of information being stored.

Accordingly, in a system comprised of a first computing node and at least one of a second computing node and a storage device, this invention provides a method for communicating information from the first computing node to at least one of the following: the storage device and the second computing node. With this invention, the computing node is monitored to collect at least one estimate of available resources, and based on the estimate, an amount of data is modified. Then, the modified data is sent to at least one of the following: the storage device and the second computing node.

This invention also provides for the determination of an optimum batch size for aggregating data wherein, for a number of batch sizes, costs are estimated for sending batched information to persistent storage and for losing batched data. Then, the optimum batch size is selected from the number of different batch sizes based on sums of these costs.

This invention also provides for selective compression of data, wherein it is determined which of a number of compression algorithms do not incur an overhead that exceeds available resources. Then, one of the determined algorithms is selected to maximize compression.

DETAILED DESCRIPTION OF THE INVENTION

Figure 1:
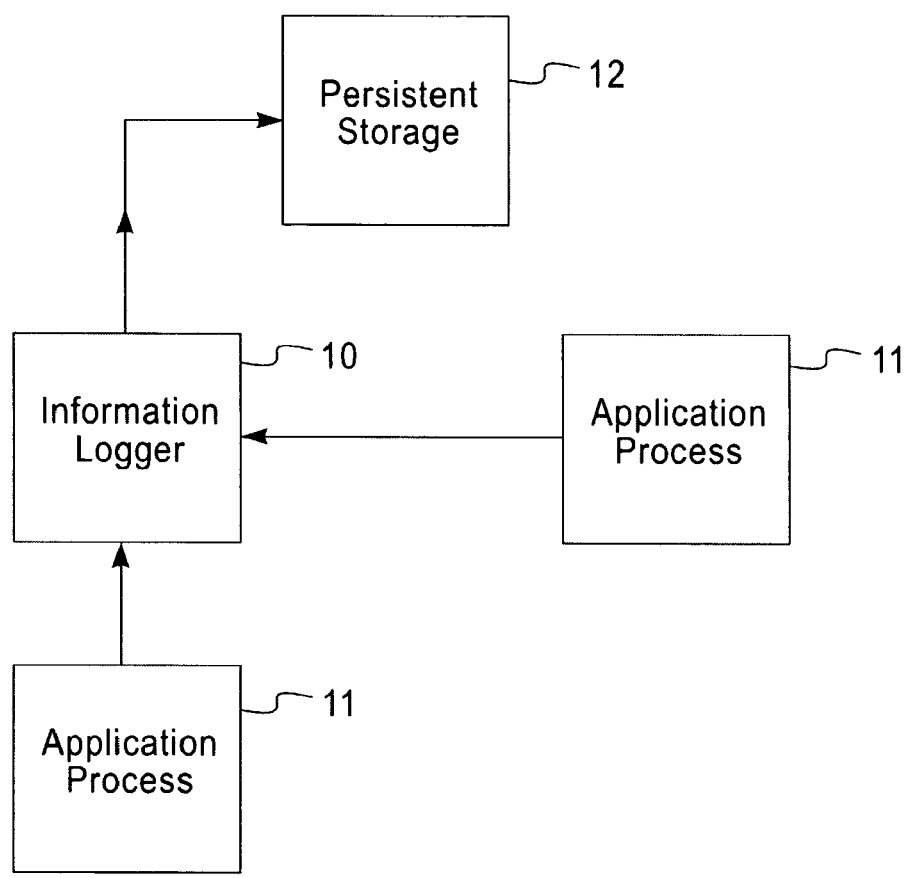
FIG. 1 depicts a system having features of the present invention, wherein one or more application processes communicate with a single information logger.

FIG. 1 depicts a system having features of the present invention. One or more application processes 11 communicate with an information logger 10 which records information in persistent storage 12. Disks, DASD, and CD's are examples of persistent storage.

The application process may include, for example, an executing program, which is monitored for performance statistics such as CPU utilization, response time, I/O bandwidth, network bandwidth, etc. Statistics, such as CPU utilization, resulting from the monitoring are then sent to an information logger. The logger can be implemented, for example, in software using standard programming languages (e.g. Java, C, C++, assembly, machine language, and others) available from a wide variety of vendors. One aspect of this invention in this example is to decide on how much, or in what form, information is sent to the information logger for recording in persistent storage.

Figure 2:
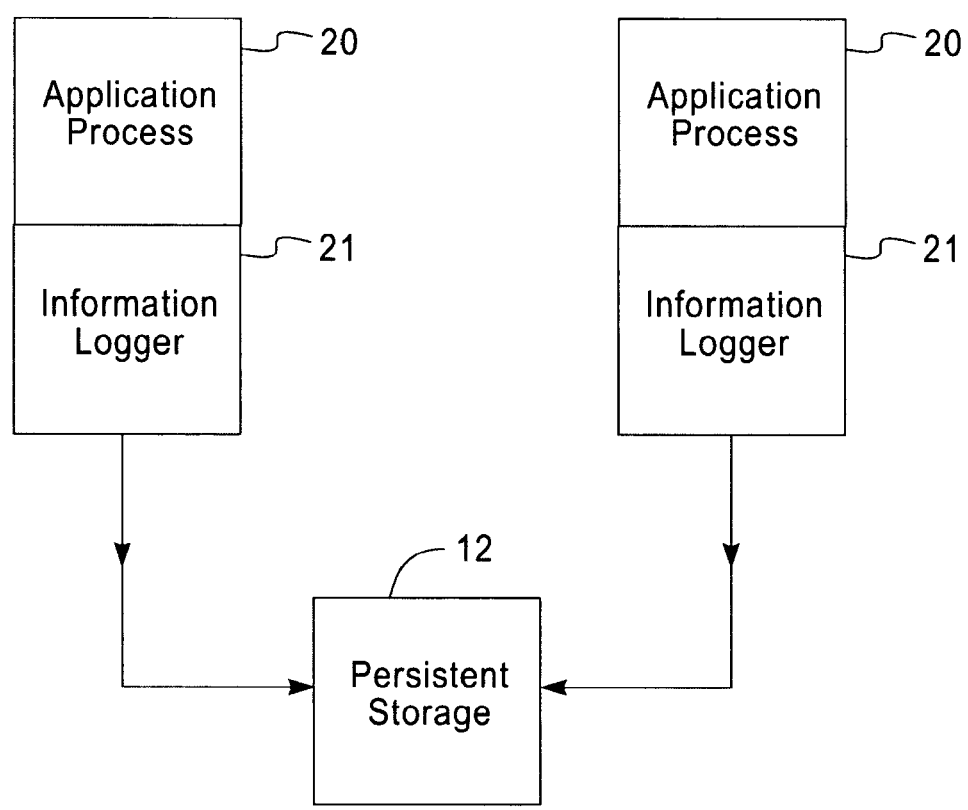
FIG. 2 depicts another system having features of the present invention, wherein different information loggers are associated with different application processes.

FIG. 2 depicts another system having features of the current invention. Different information loggers 21 are associated with different application processes 20. This is in contrast with FIG. 1 in which a single information logger is associated with multiple application processes.

Figure 3:
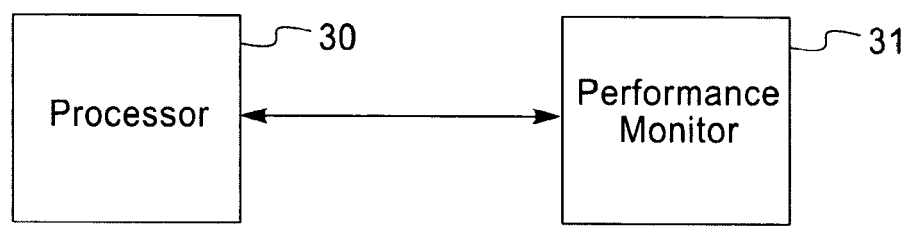
FIG. 3 depicts a processor with an associated performance monitor in accordance with the present invention.

A processor 30, which may be running an application process, may be monitored by a performance monitor 31 as depicted in FIG. 3. The performance monitor 31 may optionally monitor I/O, networks, and/or disks, in addition to CPU's.

A performance monitor can be implemented, for example, in software using standard programming languages (e.g. Java, C, C++, assembly, machine language, and others) available from a wide variety of vendors.

In one example of this invention, the performance monitor may send performance results, such as CPU utilization, from an application process, such as an executing computer program, running on a processor 30 to an information logger which then selects what results are to be stored in persistent storage.

Figure 4:
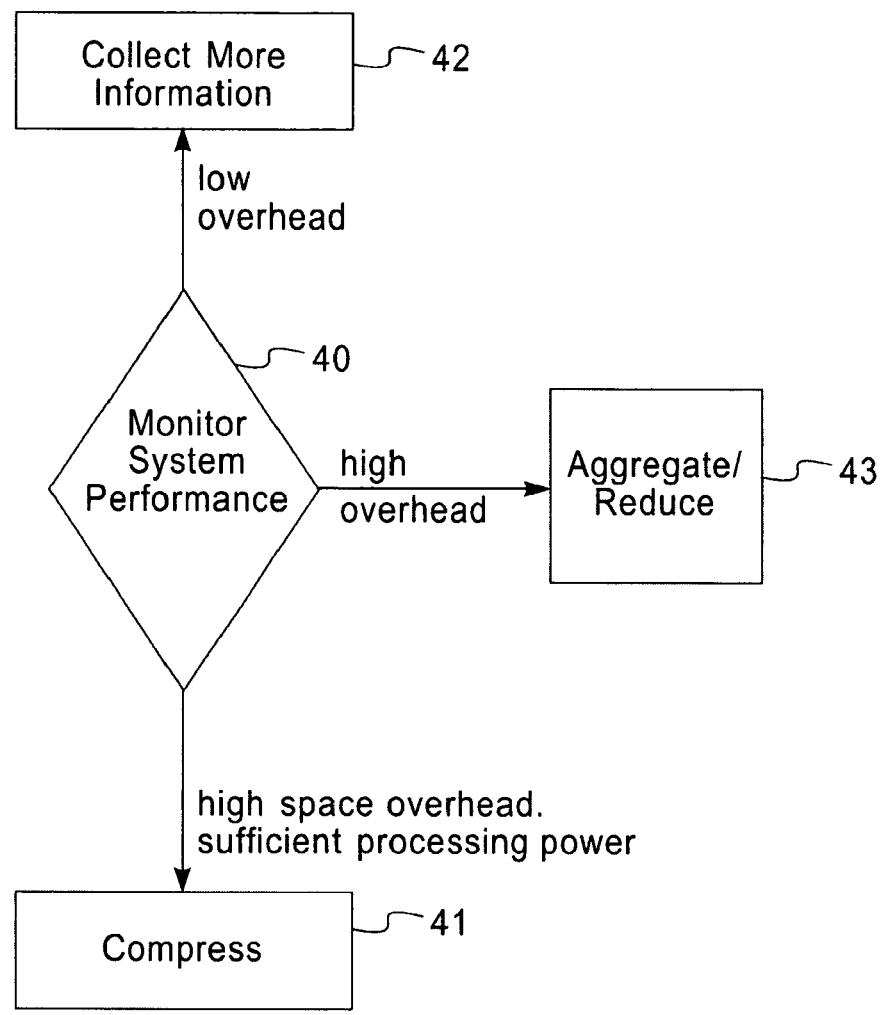
FIG. 4 depicts a method for adaptively collecting performance and event information in accordance with the present invention.

FIG. 4 depicts a flow diagram of a method of operation for the invention. In step 40, at least one application is running on at least one processor 30 and periodically sends information to persistent storage 12. At times, the overhead for sending information to persistent storage may be high. The performance monitor 31 of FIG. 3 may be used in step 40 to determine the amount of overhead for storing information.

When it is determined that the amount of overhead for storing information is high, processing may proceed to step 43. In step 43, the system reduces the overhead for storing information. It may use at least one of several methods for doing so:

Collect the information periodically, where overhead can be reduced by collecting information at less frequent intervals.

When the system is collecting sequences of numbers which could represent, for example, performance characteristics of the system, maintain an average of several values in persistent storage instead of storing a new number each time a new value is determined. At times, it will store an average of several values persistently. The number of values which are averaged before being stored in persistent storage may be increased in step 43 to decrease overhead.

Store moving averages instead of just the averages of the numbers since the last average was stored on disk. For example, suppose that the system receives 5 new numbers before storing a number on disk. A moving average of the last 50 numbers would represent the average of the last 50 numbers. This moving average could be stored instead of storing a simple average of the 5 numbers received since the last write to disk.

Keep several values in main memory before storing all of them on disk. This batching of updates to persistent storage can reduce overhead considerably over storing each individual value as soon as it is received. A drawback to this approach is that information which is not immediately stored on disk could be lost in the event of a machine failure. Decisions of whether to batch updates to disk or not could be based on the likelihood of failure.

When the system has sufficient resources available as determined by step 40, it can choose to reduce the amount of data reduction and collect more data (step 42). This results in a higher degree of accuracy of information maintained in persistent storage 12.

Our invention includes the following method for determining whether to batch updates to disk, and if so, how large the batches should be. A cost is assigned to information lost in the event of a failure. For example, a cost function might be:

$$C1(s) = a*p*s,$$

where a is a constant, p is the probability of failure, and s is the amount of information which is accumulated before the entire batch is written to disk (i.e. the batch size).

Figure 5:
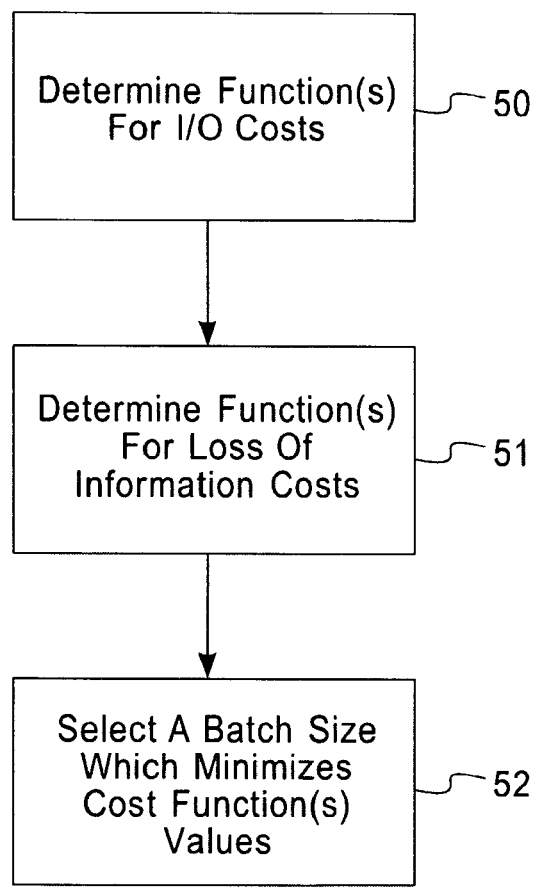
FIG. 5 depicts a method for determining batch sizes in accordance with the present invention.

This is a simple cost function in which the cost scales linearly with the batch size. More complicated functions are also possible. For example, the cost function might include other parameters besides the batch size, such as the specific information which is lost. Step 51 in FIG. 5 depicts determining a cost function for information lost in the event of a failure. C1 is such an example. The order of steps 50 and 51 is interchangeable. Steps 50 and 51 can also be done in parallel.

A cost is also assigned to the overhead for sending information to persistent storage. For example, a cost function might be: $C2(s) = b*r/s$, where b is some constant, r is the average rate at which information is sent to disk, and s is the batch size. More complicated cost functions are also possible. For example, the cost function might be dynamic and depend on the load on the system. When the I/O subsystem is heavily loaded, sending more information to persistent storage might overload the system. This would be reflected in the cost function which would favor delaying updates to persistent storage when the I/O system is overloaded. Step 50 in FIG. 5 depicts determining a cost function for sending information to persistent storage. C2 is an example of step 50 of FIG. 5.

The total cost C3 would be the sum of C1 and C2:

$$C3(s) = a*p*s + b*r/s$$

The system then can determine a value of s which minimizes which minimizes C3, the value resulting from the application of the cost function on s. Standard techniques from first year calculus can be used to minimize C3. Other methods (e,g, simple approximations) can be used to minimize C3 as well. Step 52 of FIG. 5 depicts the step of picking a batch size which minimizes the total cost function. The net result is that the system chooses a batch size s for sending information to disk which balances the need for good performance along with the need for minimizing information lost in the event of a system failure.

A cost function for information lost in the event of a failure might take into account and grow with a probability of a failure and/or information lost in the event of a failure. Information lost in the event of a failure is often proportional to expected batch sizes.

A cost function for sending information to disk might grow with the rate at which information is sent to disk. It might also decrease with increasing batch size.

A cost function for sending information to a remote node might grow with the rate at which information is sent to the remote node. It might also decrease with increasing batch size.

In an alternative embodiment, information may be sent to a remote node instead of to disk. In this case, the cost function C2 or a similar cost function might represent the cost of sending updates to a remote node.

In other cases, the cost (e.g. in CPU, disk, I/O, etc.) to create a batch might depend on the batch size. Let $C4'(s)$ be the cost to create a batch of size s. In many cases, $C4'(s)$ will be insignificant compared to the costs associated with storing data on disk and/or sending data to a remote node in which case it can be ignored. In cases where $C4'(s)$ is significant, however, we have the following cost equation:

$C3'(s) = C1'(s) + C2'(s) + C4'(s)$, where $C3'(s)$ is the total cost, $C1'(s)$ is the cost for information lost in the event of a failure and $C2'(s)$ is the cost assigned to sending information to persistent storage and/or to a remote node.

Another key aspect of the invention is selectively compressing information before sending it to disk. Compressing information reduces I/O bandwidth consumed as well as disk space utilization. On the negative side, it can result in more CPU overhead. The system thus needs to balance the need for low processing overhead and I/O bandwidth combined with disk space utilization.

Figure 6:
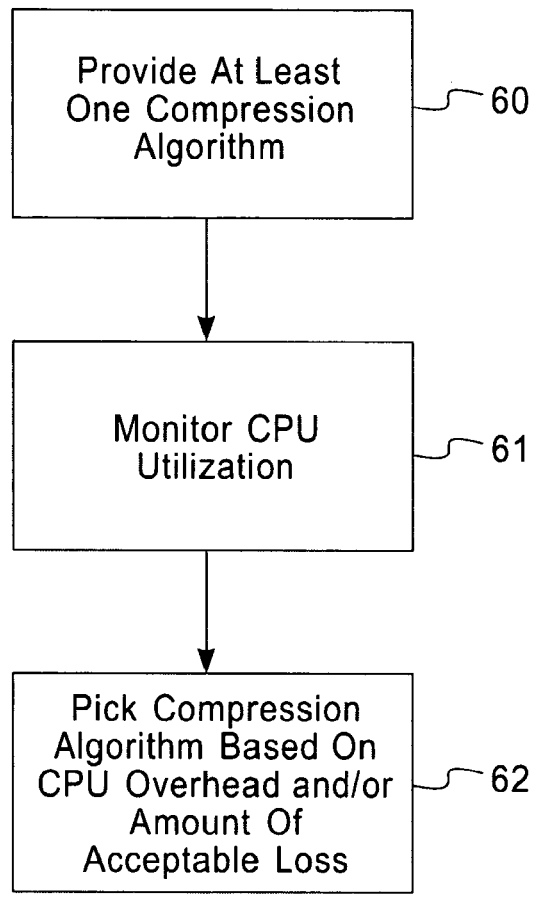
FIG. 6 depicts a method for compressing information in accordance with the present invention.

Compression is depicted in box 41 of FIG. 4. A preferred method for selectively performing compression is depicted in FIG. 6. The system has at least one but typically a plurality of compression algorithms available to it (step 60). Note that, throughout this specification, the term "compression algorithm" can be interpreted as "implementation of a compression algorithm". For each compression algorithm, the system has an estimate of its overhead, its fidelity (i.e. if the compression algorithm results in loss of information, the degree of loss), and the amount of size reduction it is likely to result in. The system makes a determination of the CPU resources r which are available for compression (step 61). The performance monitor 31 can help with this determination. When the system has a batch of data to write to persistent storage, the data may have a parameter B associated with it indicating the degree of loss which can be tolerated. If no such parameter is present, only lossless compression algorithms will be tolerated. From the available compression algorithms which do not result in more loss than B and which are not expected to result in more than r CPU resources, the compression algorithm resulting in the smallest compressed data is used (step 62). In the worst case, no compression is performed.

A fidelity threshold might be, for example, 99.5% of the original bytes are preserved.

As an optional step, if no compression, or an insufficient amount of compression is performed at the time that data is sent to persistent storage, the system can wait until the system has sufficient resources to perform compression before compressing the data.

This invention has been described in the context of reducing overhead for storing information in persistent storage. An obvious generalization is to use the invention for reducing I/O bandwidth and overhead for communicating information from a computing node to another computing node.

Figure 7:
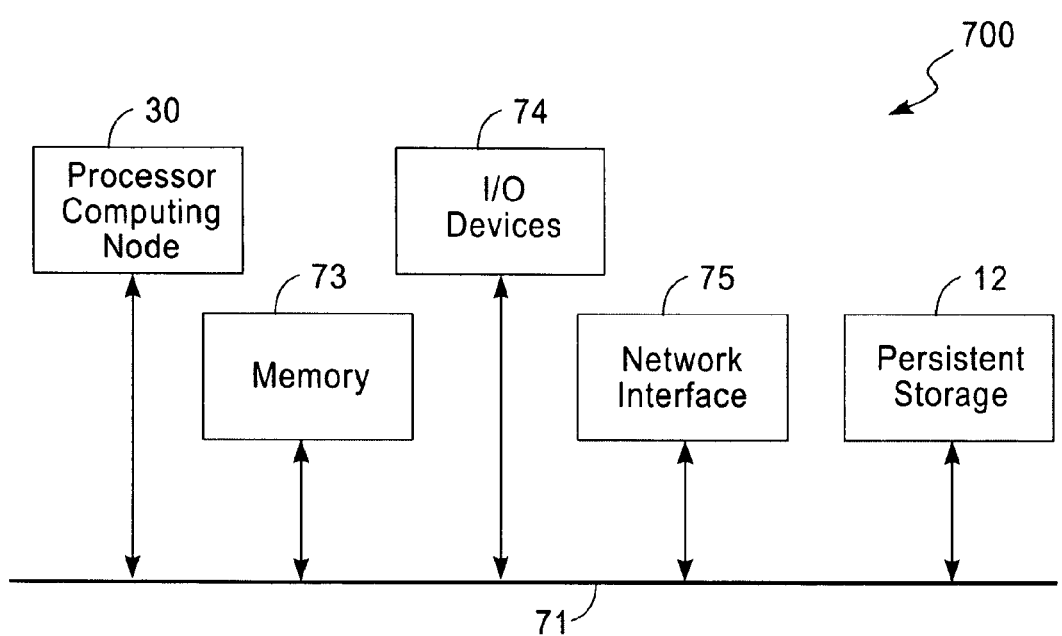
FIG. 7 is a block diagram illustrating a hardware implementation of a computing system with which the invention may be implemented.

FIG. 7 is a block diagram illustrating a hardware implementation of a computing system 700 within which the invention may be implemented. For example, the illustrative architecture of FIG. 7 may be used in implementing the information loggers, persistent storage, application processes, performance monitors, etc., as mentioned above in this application.

Further, it is to be understood that the individual components/steps may be implemented on one or more such computer systems. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system 700 may be implemented in accordance with at least one processor or computing node 30, a memory 73, I/O devices 74, a network interface 75, and persistent storage 12, coupled via a computer bus 71 or alternate connection arrangement.

It is to be understood that the system 700 may include one or more processors 30, which typically execute instructions corresponding to the flow diagrams in FIGS. 4, 5, and 6. An information logger 10, application process 11, and/or a performance monitor 31 could execute on one or more processors 30.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include, for example, memory associated with a processor or CPU, such as, for example, RAM, ROM, caches, etc.

Persistent storage may include, but is not limited to disk storage, hard drives, removable memory devices (e.g., diskettes), etc.

A storage device may include, but is not limited to, memory, persistent storage, etc. A storage device may exists on a mobile or pervasive device, such as a cell phone.

Input/output devices or I/O devices may include, for example, one or more input devices (e.g., keyboard, mouse, etc.) for entering data to the processing unit, and/or one or more output devices (e.g., speaker, display, etc.) for presenting results associated with the processing unit.

A network interface may include, for example, one or more transceivers to permit the computer system to communicate with another computer system via an appropriate communications protocol.

Accordingly, software components including instructions or code for performing the methodologies described herein may be stored in persistent storage and, when ready to be utilized, loaded in part or in whole into memory and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

I claim:

1. A method for determining a batch size for aggregating data comprising the steps of:
    estimating first costs, as a function of different sizes, for sending data to one of the following: a storage device and a computing node;
    estimating second costs, as a function of different sizes, for losing said data; and
    selecting said batch size based on said estimated first and second costs,
    the steps of the estimating and selecting performed by an information logger executing on one or more processors, and receiving performance data of an application process executing on one or more of the processors, wherein the performance data is aggregated based on the selected batch size.

2. The method of claim 1 in wherein estimating said first costs comprises determining a cost function.

3. The method of claim 1 in wherein estimating said second costs comprises determining a cost function.

4. The method of claim 1 in which said batch size is determined by minimizing an aggregation of at least two of said estimated costs.

5. The method of claim 4, in which said aggregation comprises a sum.

6. The method of claim 1 further comprising the step of sending an amount of data corresponding to said batch size to at least one of said storage device and said computing node.

7. A program storage device readable by machine, tangibly embodying a program of instructions executable by the machine to perform method steps for determining a batch size for aggregating data, the method steps comprising:
    estimating first costs, as a function of different sizes, for sending data to one of the following: a storage device and a computing node;

estimating second costs, as a function of different sizes, for losing said data; and selecting said batch size based on said estimated first and second costs, the method performed by an information logger executing on one or more processors, and receiving performance data of an application process executing on one or more of the processors, wherein the performance data is aggregated based on the selected batch size.

* * * * *